July 17, 1956

E. MINISINI 2,754,789

GYRO CONTROLLED STEERING SYSTEM

Filed Jan. 15, 1945

INVENTOR
EUGENIO MINISINI
BY
ATTORNEY

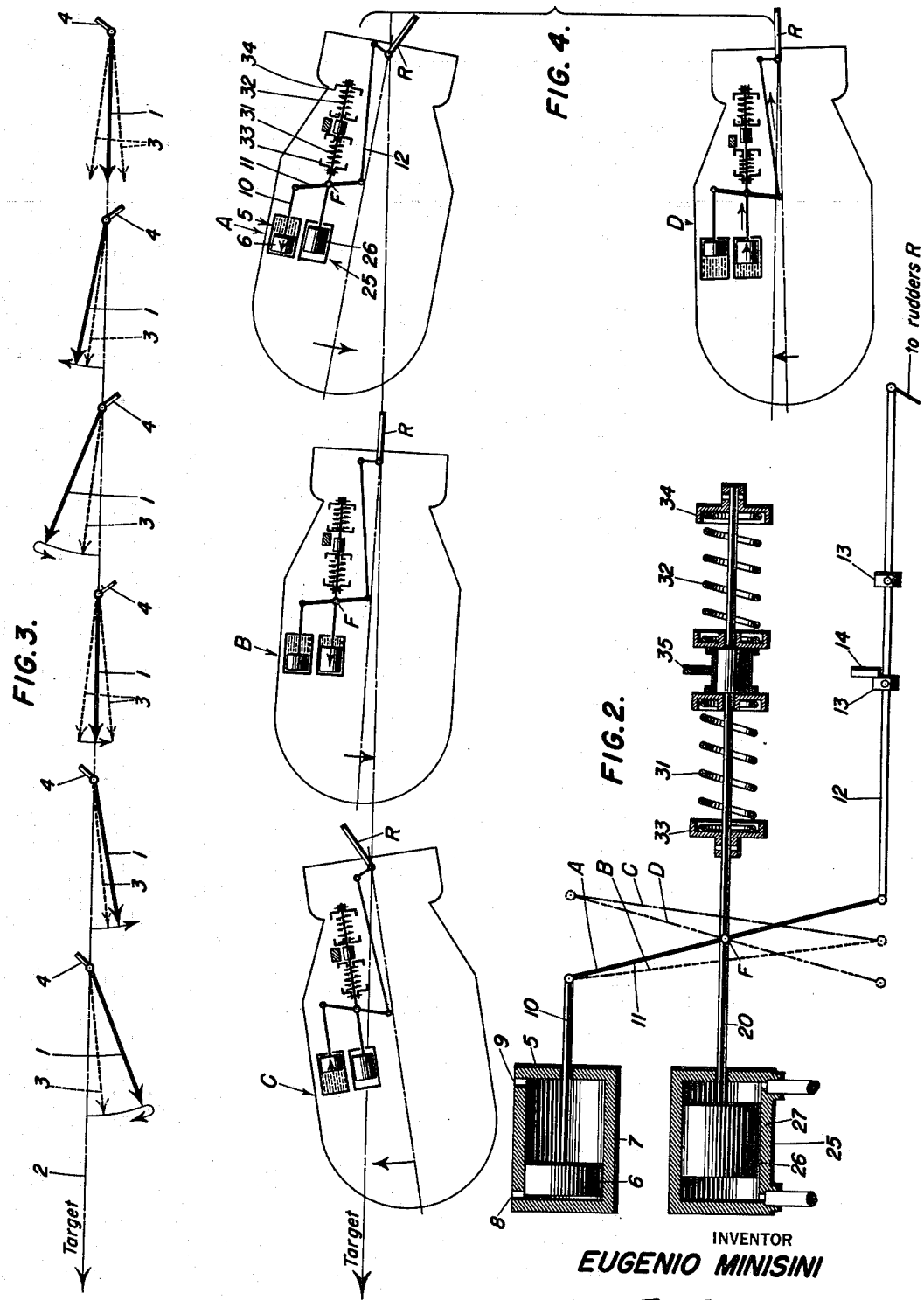

United States Patent Office 2,754,789
Patented July 17, 1956

2,754,789
GYRO CONTROLLED STEERING SYSTEM

Eugenio Minisini, New York, N. Y., assignor to the United States of America as represented by the Secretary of the Navy Application January 15, 1945, Serial No. 572,939

4 Claims. (Cl. 114—24)

This invention relates to gyro controlled steering systems such as those employed in controlling the course of underwater torpedoes. While described in connection with a torpedo, the invention will be seen to be applicable to other automatically guided devices and/or vehicles.

Automatic steering systems of the class under consideration commonly use a free gyroscope adapted to maintain a position corresponding to a desired true course throughout the travel of the torpedo, rudder controlling means being provided which, when the torpedo deviates by a predetermined angle from the true course, throws the rudder means in such direction as to turn the torpedo back toward the true course. For the sake of simplicity, in torpedo controls as presently constructed, the rudders are arranged to assume only two positions, corrective steering being effected by alternately throwing the rudder or rudders hard over to port and starboard. It will be appreciated that with such a system it is impossible to prevent the torpedo from overshooting the true course, so that its actual course is a sinuous one. At the instant of rudder reversal the torpedo has already acquired angular momentum which carries it considerably beyond the angle at which the rudders reverse. The amplitude of the swing accordingly exceeds the swing angle which would be delineated by the positions of rudder reversal. The improved steering control system aims to improve the performance of steering systems with respect to the indicated characteristic by providing means whereby the rudders are influenced not only by the angular relationship between the torpedo axis and the true course, but also by the rate of angular deflection of the torpedo axis with respect to the true course, the resultant action being such as to maintain the torpedo closer to the true course.

Another important object of the present invention is to provide mechanism responsive to the angular velocity of the torpedo in a horizontal plane and so arranged as to return the rudders to a central position upon attainment of a predetermined angular velocity by the torpedo as it swings in response to corrective movement of the rudders.

Another object is to provide such a mechanism which is of very simple and rugged construction, compact and readily adapted for installation in torpedoes already constructed and having conventional two-position steering systems of the type previously mentioned.

Other objects and advantages will be apparent upon consideration of this disclosure in its entirety.

In the drawings:

Fig. 2 is a schematic diagram of the lever system and steering engines showing the positions occupied by the parts in operation;

Figure 1:
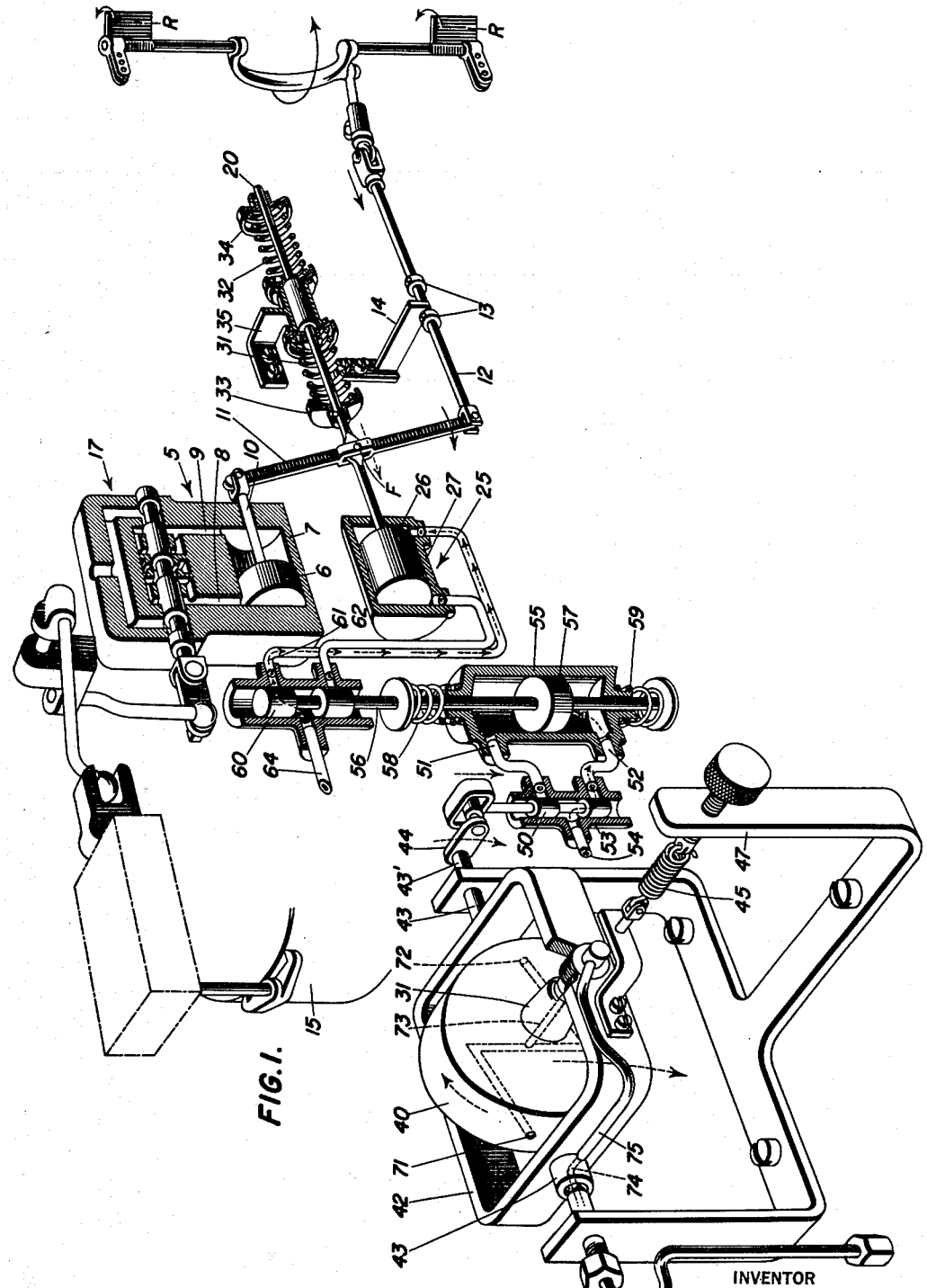
Fig. 1 is a diagrammatic perspective view of a steering system constructed and arranged in accordance with the present invention.

Fig. 3 is a diagrammatic view showing successive positions occupied during a run by a torpedo equipped with conventional two-position steering system, also indicating the rudder positions; and Fig. 4 is a view similar to but more detailed than Fig. 3 diagrammatically showing successive positions of a torpedo and the principal steering components thereof, the steering system being constructed in accordance with the present invention, during a run.

Referring now the drawings, the arrows 1 designate in Fig. 3 a conventional torpedo and its direction of travel, indicating successively in plan the positions the torpedo occupies with respect to an ideal or aimed course depicted by the straight line 2. Dotted lines 3 designate the angular positions at which reversal of the rudder, 4, is effected by the conventional two-position steering system. The angle between the true course and the position of rudder reversal is the same on both sides of the true course and will be referred to as the "throw position angle." It will be noted that the torpedo continues to swing away from the true course and the throw position angle, after reversal of the rudders, due to the angular momentum which the torpedo has acquired, but reverses its course gradually when the steering effect overcomes the angular momentum. The mechanism by which steering in this conventional manner is effected forms no part of the present invention except in so far as conventional components are interconnected with, and their action modified by the mechanism constituting the preferred embodiment of this invention.

For purposes of illustration an air operated main steering engine 5 is shown which may be of the conventional or any suitable type, comprising a piston 6 moveable to either of two extreme positions within the cylinder 7 under the influence of air admitted under pressure to either end of the cylinder, and ordinarily alternately first to one end of the cylinder and then the other, through the ports 8, 9. The piston is connected to the rudder R by suitable connecting means including piston rod 10, lever 11 and linkage 12, the latter carrying stops 13 adapted to co-act with a fixed abutment 14 to limit positively the throw of the rudder. Movements of the piston 6 are controlled by a main gyro contained in a casing 15 and not shown in detail and a pilot valve assembly 17. The details of these parts form no part of the present invention.

The effect of the main steering engine, which tends to throw the rudder alternately hard over in opposite directions to stabilize the torpedo in the conventional manner, is modified by bodily displacement of the fulcrum F of the lever 11. The fulcrum is carried by a slidable rod 20 actuable by a secondary steering engine generally designated 25 and comprising a piston 26 whose travel is half that of the piston 6 of the main steering engine. Piston 26 is mounted in a cylinder 37 and moveable in either direction from a centered position in which it is normally yieldably maintained by the springs 31, 32 mounted upon rod 20 and reacting at their outer ends against abutments 33, 34 carried by the rod. At their inner ends the springs react against a fixed bracket 35. The resistance of the springs 31, 32 is greater than the reaction existing at the fulcrum F due to the resistance of the rudders under the most severe operating conditions to be encountered. Accordingly, when the piston 26 is in the centered position, the main steering engine 5 operates in the normal manner to throw the rudders R alternately hard over in opposite directions.

Assuming that the piston of the main steering engine has been displaced in one direction, as shown at A in Figs. 2 and 4, tending to throw the rudder hard over, it will be seen that the travel of the piston 26 of the supplemental steering engine is such that, when the last mentioned piston is moved in the same direction, as shown at B, the displacement of the fulcrum F is sufficient to return the rudder to the centered position. The piston 26 is so moved, under the influence of the controlling mechanism presently to be described, that it follows and always moves in the same direction as the piston 6, returning the rudder to the centered position after each actuation thereof by the main steering engine, as soon as the angular deflection of the torpedo has reached a predetermined amount.

Primary control of the supplemental steering engine is provided by a restrained gyro the wheel 40 of which is rotatable about an axis transverse with respect to the torpedo axis and defined by its spindle 31. The wheel and spindle are carried by a single gimbal frame 42 the axis of which lies parallel to the torpedo axis. A tension spring 45 connected at one end to the gimbal frame 42 and at its other end adjustably secured to a stationary frame 47 fixed to the torpedo, resists precession of the gyro and thus restrains it as indicated. Precession is effected by the angular deflection of the torpedo about a vertical axis, and when it occurs the springs which is momentarily stretched by the precession of the gyro 40 as the effect of the angular velocity of deflection and again contracts at the extremity of the deflection and so restores the gyro to its original neutral position. The gyro and its restraining spring thus comprise what is aptly called a gyro pendulum. An extension 43' of the gimbal shaft 43 carries a crank 44 which, upon precession of the gyro and consequent rotation of the shaft, actuates a pilot valve 50 arranged, when the valve is in the centered position which it occupies when the gimbal lies in its normal, horizontal position, to close off both of the two outlets 51, 52 which lead from opposite ends of the valve casing 53. An inlet 54, connected to a central portion of the valve casing, is fed from a source of fluid pressure, such as the air flask of the torpedo. This pressure is preferably reduced below that of the flask, however, as by a reducing valve (not shown). Relatively low pressure is used in this valve for ease of operation. The outlets 51, 52 are connected, as shown in Fig. 1, to opposite ends of a pneumatic relay 55 consisting of a simple cylinder and piston assembly, the piston 57 being normally maintained in a centered position by the centering springs 58, 59. The piston rod 56 is connected to a relay valve 60. The general arrangement of the valve 60 will be seen to be similar to that of the valve 50. It normally closes off the air inlet 64, also connected to the air flask or other source of air under higher pressure. When valve 60 is thrown in either direction by actuation of the piston 57 it admits air to one or the other of its outlets 61, 62. One of these is connected to each end of the cylinder 27 of the supplemental steering engine.

In the preferred embodiment shown, the gyro wheel 40 is driven by the reaction of jets of air discharged angularly from its periphery through orifices as 71, 72, the air being supplied through pasages 73 74 formed in the shafts 31, 43 and through suitable connecting tubing as 75, 75' providing communication with an appropriate source of air under pressure. This system is so designed that upon firing of the torpedo and resultant admission of air to the herein described (and the other) operating components of the torpedo, the time required for the gyro wheel to come up to operating speed exceeds the time required for the torpedo, if equipped with a gyro angle setting system, to complete a turn under the control of such system. Angle shots may therefore be made in the conventional manner, and the action of the vertical rudders is not affected by the supplemental control mechanism herein disclosed until the torpedo has assumed the desired angular course. In the embodiment herein disclosed, the wheel 40 requires a period of about 45 seconds to reach its operating speed of approximately 8000 R. P. M.

While it will be apparent that the preferred embodiment of our invention herein disclosed is well calculated adequately to fulfill the objects and advantages primarily stated, it will be appreciated that the invention is subject to variation, modification and change within the spirit and scope of the subjoined claims.

I claim:

1. In a steering system of the type having a guiding member, such as a rudder, a main gyro, a main steering device controlled by the main gyro for effecting a normal movement of the guiding member in opposite directions and equal amplitudes from a neutral position as a vehicle guided by said member is propelled along a desired course, whereby said vehicle is alternately deflected to opposite sides of said course, the improvements comprising in combination; a supplemental steering device operatively connected to the main steering device and to the guiding member adapted to modify said normal movement and reduce the deflection of said vehicle from said course, and a supplemental gyro responsive to the angular velocity of the guided device about an axis perpendicular to said course for controlling the operation of the supplemental steering device.

2. A system in accordance with claim 1 wherein said supplemental gyro is of the restrained single degree of freedom type.

3. A system in accordance with claim 1 wherein said main steering device includes a lever having a movable fulcrum and said supplemental steering device includes means for moving said fulcrum.

4. A system in accordance with claim 1 in combination with a torpedo carrying same.

References Cited in the file of this patent

UNITED STATES PATENTS

| 1,418,791 | Hammond | June 6, 1922 |
|---|---|---|
| 1,418,792 | Hammond | June 6, 1922 |
| 2,099,808 | Havill | Nov. 23, 1937 |
| 2,110,934 | Berges | Nov. 30, 1937 |
| 2,158,584 | Koster | May 16, 1939 |
| 2,234,326 | Tiebel | Mar. 11, 1941 |
| 2,340,524 | Fischel et al. | Feb. 1, 1944 |